United States Patent
Shah et al.

(10) Patent No.: US 6,694,361 B1
(45) Date of Patent: Feb. 17, 2004

(54) ASSIGNING MULTIPLE LIDS TO PORTS IN A CLUSTER

(75) Inventors: Rajesh R. Shah, Portland, OR (US); Jenlong Wang, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 09/609,330

(22) Filed: Jun. 30, 2000

(51) Int. Cl.[7] .............................................. G06F 15/177
(52) U.S. Cl. ........................ 709/222; 709/220; 709/221; 709/238; 709/239; 370/351; 370/388; 370/389; 713/1; 713/100
(58) Field of Search ................................ 709/220–222, 709/229, 238–239; 370/385–389, 216, 351; 710/305–306; 713/1, 100; 712/15

(56) References Cited

U.S. PATENT DOCUMENTS 5,854,909 A * 12/1998 Agrawal ..................... 395/309
6,430,182 B1 * 8/2002 Oyama ....................... 370/388

* cited by examiner

Primary Examiner—Rupal Dharia
Assistant Examiner—Hien C. Le
(74) Attorney, Agent, or Firm—Schwegman, Lundberg, Woessner & Kluth, P.A.

(57) ABSTRACT

A cluster includes a fabric, a host coupled to the fabric, an I/O enclosure coupled to the fabric, and a subnet manager. The subnet manager performs a topology discovery of the cluster and detects ports associated with the fabric. The subnet manager computes a minimal spanning tree for the cluster, which connects every port to every other port through a single path. The subnet manager assigns a single base LID to each port and programs the assigned LIDs into forwarding tables in the fabric. Additional LIDs are reserved for each port while the single base LID is assigned to each port such that the fabric is functional and connected when the subnet manager is performing a path analysis of the cluster.

26 Claims, 7 Drawing Sheets

ASSIGNING MULTIPLE LIDS TO PORTS IN A CLUSTER

FIELD

The present invention generally relates to data networks and in particular relates to a method and system for assigning multiple local identification values (LIDs) to ports.

BACKGROUND

A data network generally includes a network of nodes connected by point-to-point links. Each physical link may support a number of logical point-to-point channels. Each channel may be a bi-directional communication path for allowing commands and message data to flow between two connected nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented I/O services.

Often in data networks, local identification values (LIDs) are assigned after a full path analysis for the data network is performed. This prevents connectivity between components of the data network until the full path analysis is completed. Also, if the format of the data network requires that LIDs be assigned sequentially, it is difficult to assign additional LIDs when new resources and devices are incorporated into the data network.

BRIEF DESCRIPTION OF THE DRAWINGS

A more complete appreciation of example embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same.

According to some network formats, local identification values (LIDs) are not assigned until after a full path analysis of the network is performed, which heretofore has prevented connectivity between components of the network until such full path analysis was completed. The invention provides that a single base LID is assigned to each port such that an adequate fabric connectivity is obtained in advance of the full path analysis being completed. Also, the invention provides that while the single base LID is being assigned to a port, additional LIDs are reserved for the port such that it is feasible to assign additional LIDs when new links are added to the network.

The present invention is applicable for use with all types of computer networks, I/O hardware adapters and chipsets, including follow-on chip designs which link together end stations such as computers, servers, peripherals, storage devices, and communication devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), Future I/O (FIO), System I/O and Server Net and those networks including channel-based, switched fabric architecture which may become available as computer technology advances in the Internet age to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a method and system for assigning multiple local identification values (LIDs) to ports in a simple data network having several example nodes (e.g., computers, servers and I/O units) interconnected by corresponding links and switches, although the scope of the present invention is not limited thereto.

Figure 1:
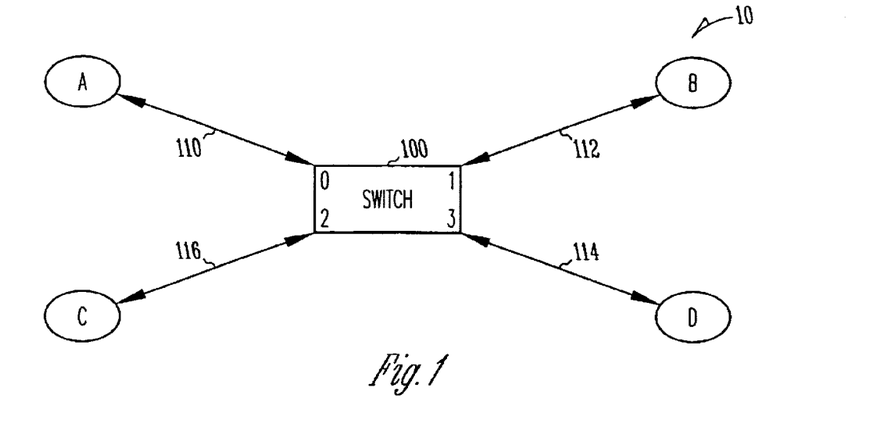
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. Each I/O unit may include one or more I/O controllers connected thereto. Each I/O controller may operate to control one or more I/O devices, such as storage devices (e.g., a hard disk drive or tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "Next Generation Input/Output (NGIO) Specification" as set forth by the NGIO Forum on Jul. 20, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s).

Figure 2:
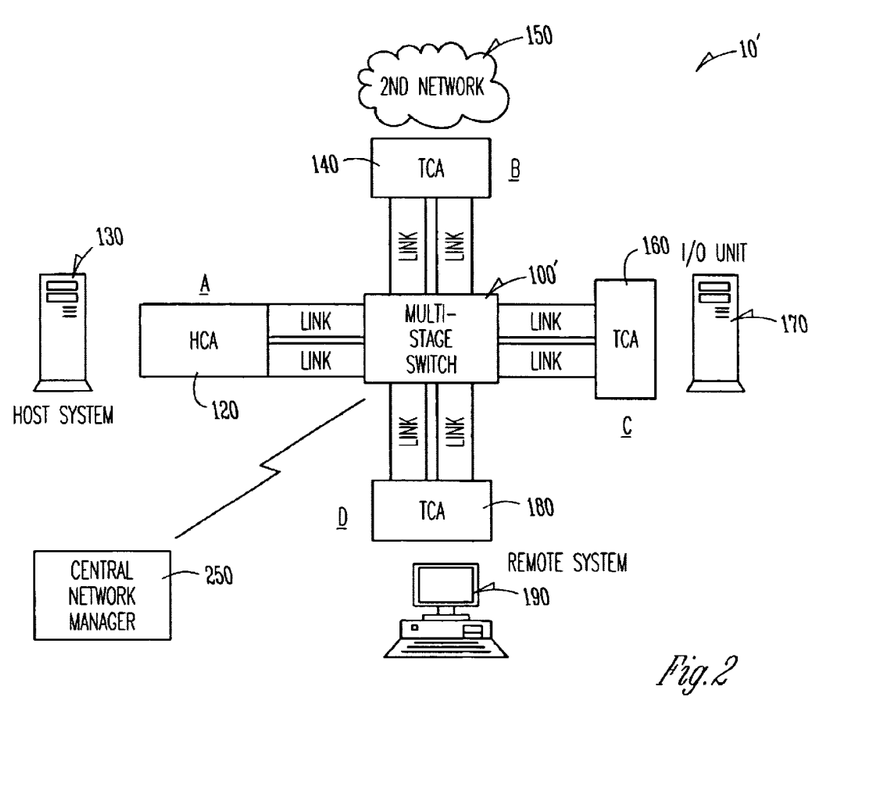
FIG. 2 illustrates another example data network having several nodes interconnected by corresponding links of a multi-stage switched fabric according to an embodiment of the present invention.

For example, FIG. 2 illustrates an example data network 10' using an NGIO architecture to transfer data from a source node to a destination node according to an embodiment of the present invention. As shown in FIG. 2, the data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any ones of target systems. In addition, any number of end stations, switches and links may be used for relaying data in groups of cells between the end stations and switches via corresponding NGIO links.

For example, node A may represent a host system 130 such as a host computer or a host server on which a variety of applications or services are provided. Similarly, node B may represent another network 150, including, but not limited to, local area network (LAN), wide area network (WAN), Ethernet, ATM and fiber channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the multi-stage switched fabric 100' which serve as intermediate nodes between the host system 130 and the remote systems 150, 170 and 190.

The multi-state switched fabric 100' may include a central network manager 250 connected to all the switches for managing all network management functions. However, the central network manager 250 may alternatively be incorporated as part of either the host system 130, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the local system 130 and a multi-stage switched fabric 100' via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 190 and the multi-stage switched fabric 100' via high speed serial NGIO links. Both the host channel adapter (HCA) and the target channel adapter (TCA) may be broadly considered as fabric hardware adapters provided to interface either the host system 130 or any one of the target systems 150, 170 and 190 to the switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO) and/or InfiniBand technologies. FIO specifications have not yet been released, owing to subsequent agreement of NGIO and FIO factions to combine efforts on InfiniBand. InfiniBand information/specifications are presently under development and will be published in a document entitled "InfiniBand Architecture Specification" by the InfiniBand Trade Association (formed Aug. 27, 1999) having the Internet address of "http://www.InfiniBandta.org". The "InfiniBand Architecture Specification" describes features and benefits which are complementary to those provided by NGIO and FIO technologies, and are similarly useful.

Figure 3:
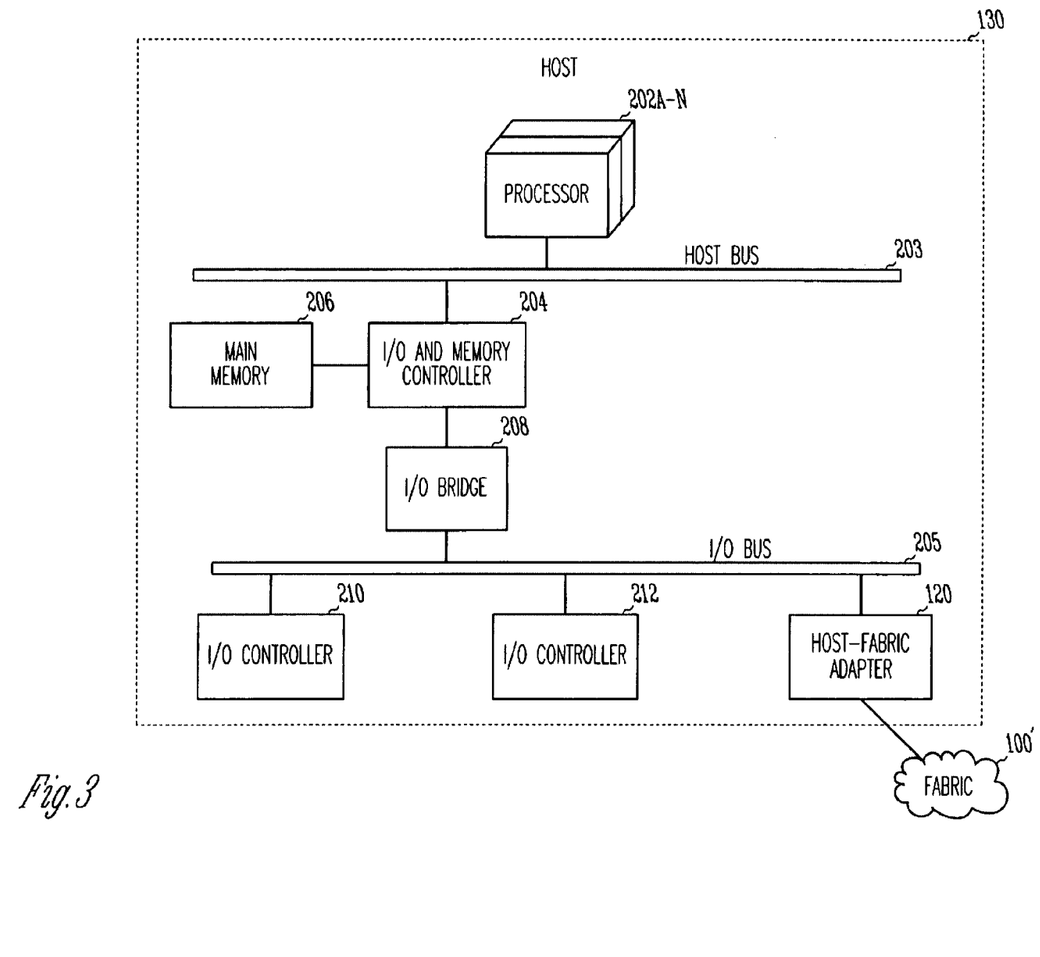
FIG. 3 illustrates a block diagram of a host system of an example data network according to an embodiment of the present invention.

Returning to discussions, one example embodiment of a host system 130 is shown in FIG. 3. Referring to FIG. 3, the host system 130 may correspond to a multi-processor system, including one or more processors 202A–202N coupled to a host bus 203. Each of the multiple processors 202A–202N may operate on a single item (I/O operation), and all of the multiple processors 202A–202N may operate on multiple items (I/O operations) on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to the I/O bus 205, including I/O controllers 210 and 212. I/O controllers 210 and 212 (including any I/O devices connected thereto) may provide bus-based I/O resources.

Figure 4:
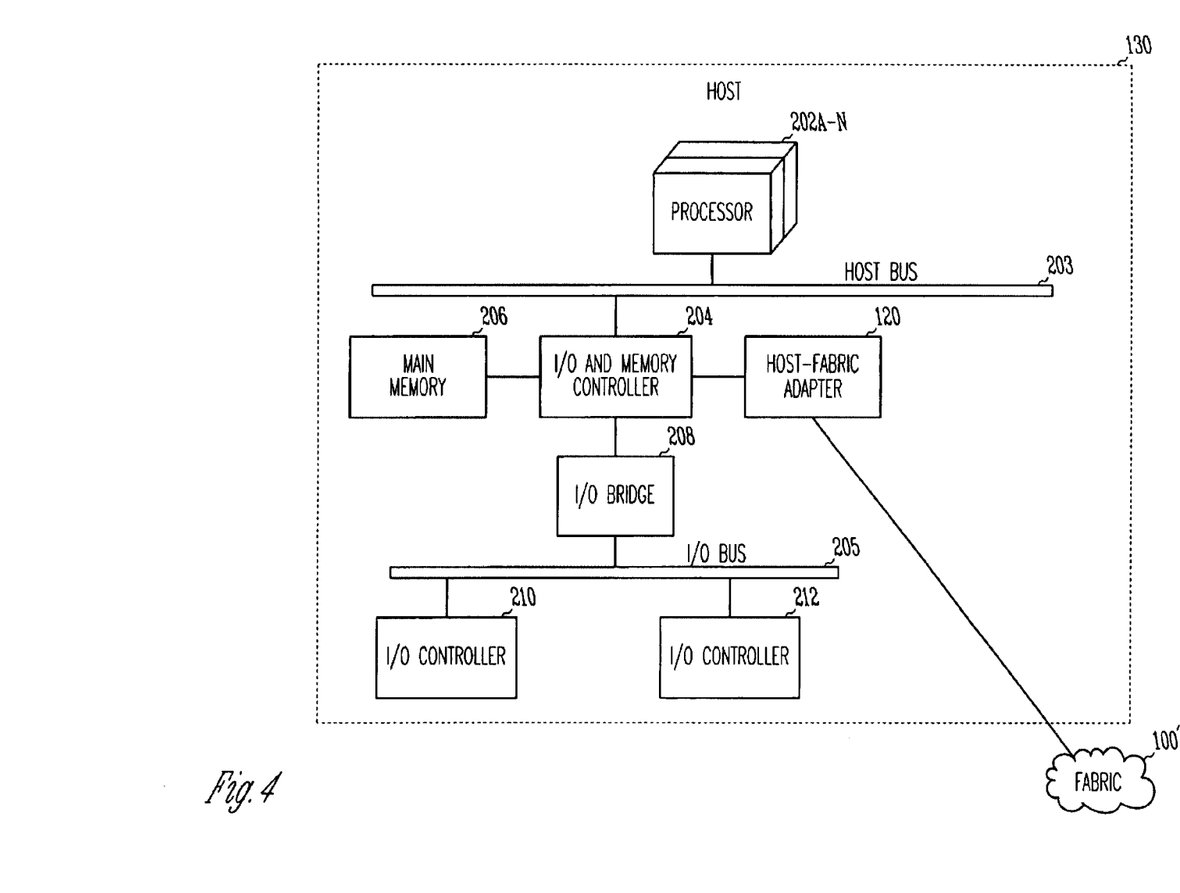
FIG. 4 illustrates a block diagram of a host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment, one or more host-fabric adapters 120 may be provided to interface the host system 130 to the multi-stage switched fabric 100'.

FIGS. 3–4 merely illustrate example embodiments of a host system 130. A wide array of processor configurations of such a host system 130 may be available. Software driver stack for the host-fabric adapter 120 may also be provided to allow the host system 130 to exchange data with one or more remote systems 150, 170 and 190 via the switched fabric 100', while preferably being compatible with many currently available operating systems, such as Windows 2000.

Figure 5:
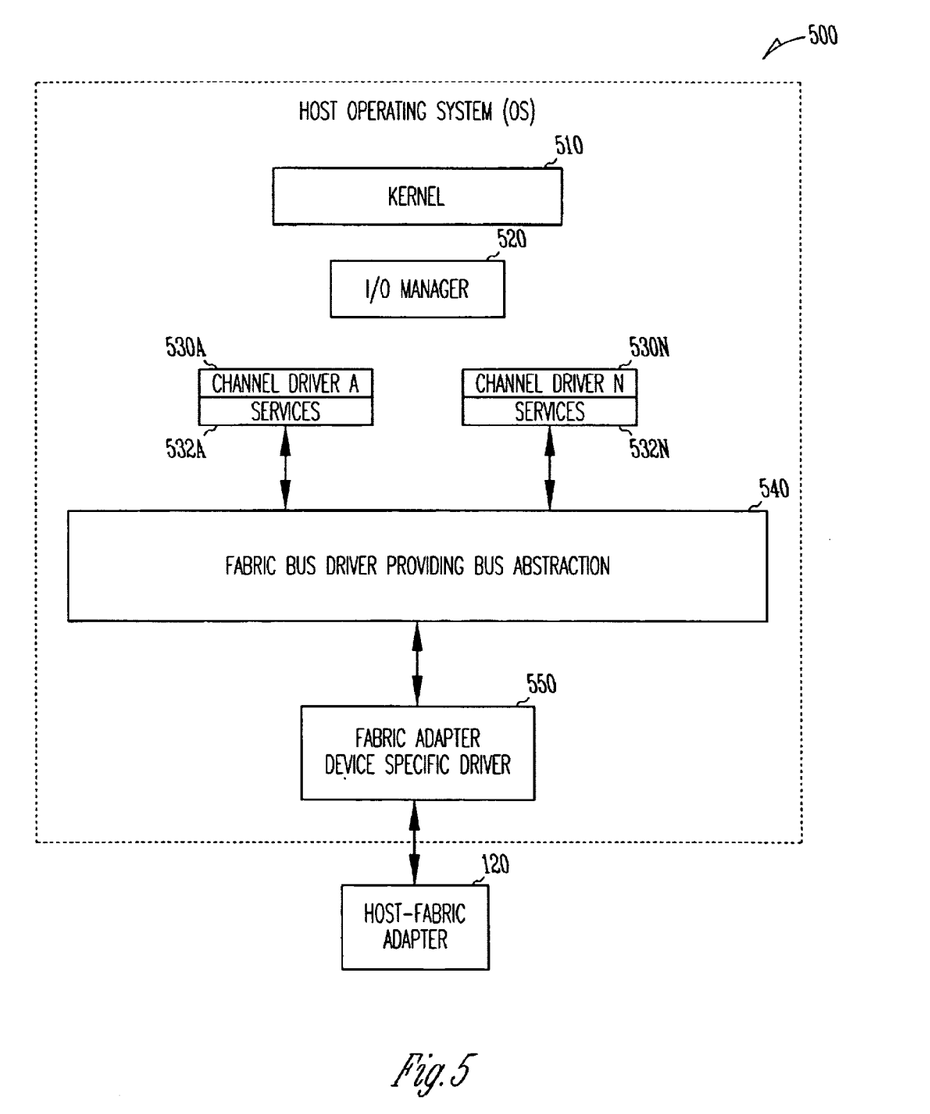
FIG. 5 illustrates an example software driver stack of a host operating system of an example data network according to an embodiment of the present invention.

FIG. 5 illustrates an example software driver stack of a host system 130. As shown in FIG. 5, a host operating system (OS) 500 may include a kernel 510, an I/O manager 520, and a plurality of channel drivers 530A–530N for providing an interface to various I/O controllers. Such a host operating system (OS) 500 may be Windows 2000, for example, and the I/O manager 520 may be a Plug-n-Play manager.

In addition, a host-fabric adapter software stack (driver module) may be provided to access the switched fabric 100' and information about fabric configuration, fabric topology and connection information. Such a host-fabric adapter software stack (driver module) may include a fabric bus driver 540 and a fabric adapter device-specific driver 550 utilized to establish communication with a remote fabric-attached agent (e.g., I/O controller), and perform functions common to most drivers, including, for example, host-fabric adapter initialization and configuration, channel configuration, channel abstraction, resource management, fabric management service and operations, send/receive I/O transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "Next Generation I/O Architectitre: Host Channel Adapter Software Specification." For example, the HCA service layer (HSL) may be inherent to all channel drivers 530A–530N for providing a set of common fabric services in a service library, including connection services, resource services, and HCA services required by the channel drivers 530A–530N to instantiate and use NGIO channels for performing data transfers over the NGIO channels. The fabric bus driver 540 may correspond to the HCA abstraction layer (HCAAL) for managing all of the device-specific drivers, controlling shared resources common to all HCAs in a host and resources specific to each HCA in a host system 130, distributing event information to the HSL and controlling access to specific device functions. Likewise, the device-specific driver 550 may correspond to the HCA device-specific driver for providing an abstract interface to all of the initialization, configuration and control interfaces of an HCA.

The host system 130 may also communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI architecture may contain work queues formed in pairs including a send queue and a receive queue in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures such as InfiniBand may also be used to implement the present invention.

In such a data network, NGIO, VI and InfiniBand hardware and software may be used to support asynchronous data transfers between two memory regions, often on different systems. Each system may serve as a source (initiator) system which initiates a message data transfer (message send operation) or a target system of a message passing operation (message receive operation). Each system may correspond to a multi-processor system including multiple processors each capable of processing an I/O completion on a different shared resource (such as work queues or other memory elements associated with a given hardware adapter). Examples of such a multi-processor system may include host servers providing a variety of applications or services, and I/O units providing storage oriented and network oriented I/O services.

Figure 6:
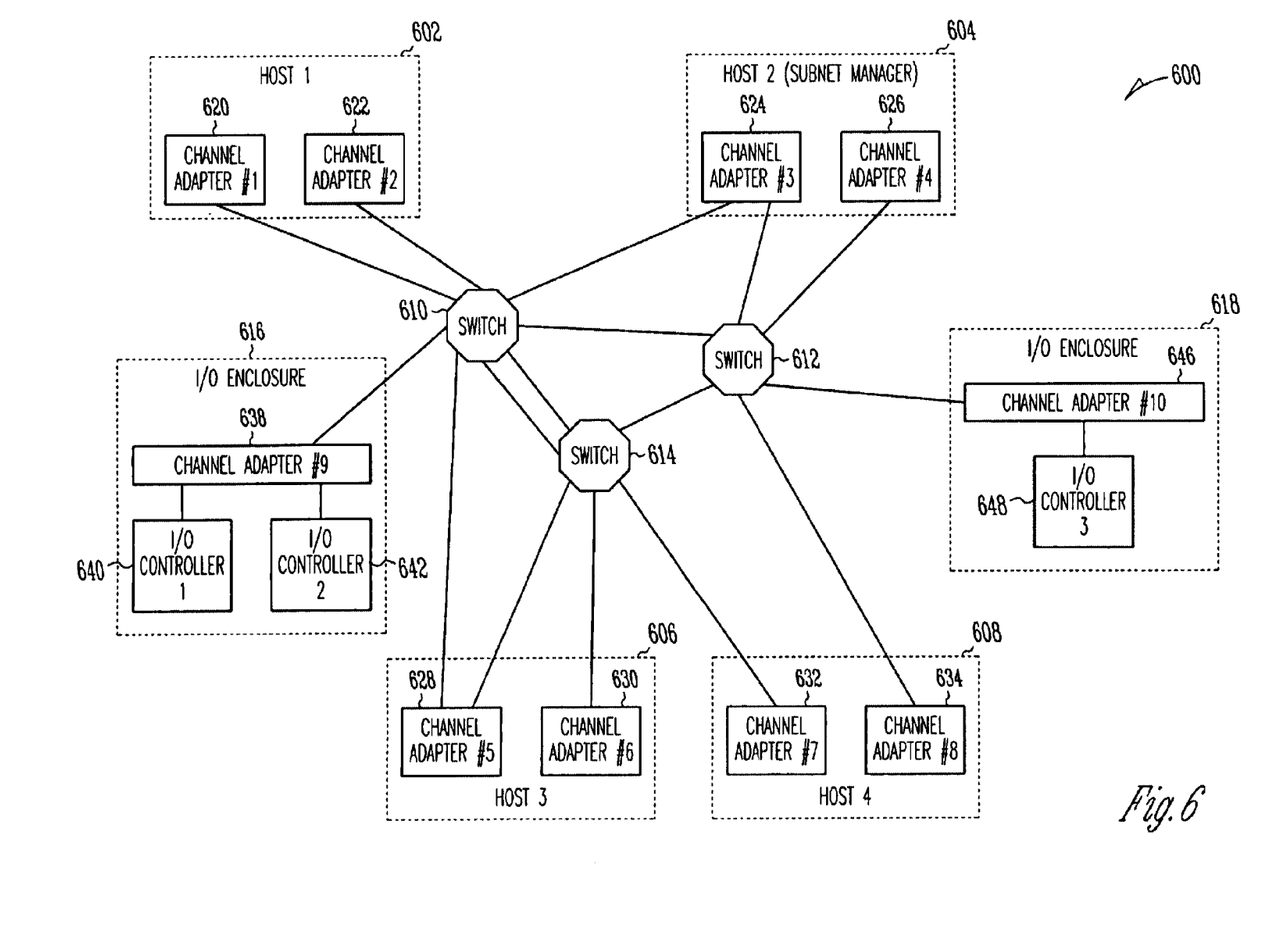
FIG. 6 illustrates an example subnet according to an embodiment of the present invention.

The InfiniBand architecture specification defines a common base to connect hosts and I/O devices together in a cluster for higher performance. A cluster that conforms to the InfiniBand architecture specification, which is referred to as a "subnet", allows hardware and software solutions from different vendors to inter-operate. Examples of things specified in the InfiniBand architecture include the link level protocol, common subnet management mechanisms and common characteristics of channel adapters and switches that connect to the cluster. FIG. 6 shows an example InfiniBand subnet. The InfiniBand subnet 600 includes a first host 602, a second host 604, a third host 606, a fourth host 608, a first switch 610, a second switch 612, a third switch 614, a first I/O enclosure 616, and a second I/O enclosure 618. The I/O enclosures contain I/O controllers that in turn have attached devices like hard disks for storage or network interface cards (NICs) for connectivity to external networks.

The first host 602 includes a first channel adapter 620 and a second channel adapter 622. The second host 604 includes a third channel adapter 624 and a fourth channel adapter 626. The third host 606 includes a fifth channel adapter 628 and a sixth channel adapter 630. The fourth host 608 includes a seventh channel adapter 632 and an eighth channel adapter 634.

The first I/O enclosure 616 includes a ninth channel adapter, a first I/O controller 640 coupled to the ninth channel adapter 638, and a second I/O controller 642 coupled to the ninth channel adapter 638. The second I/O enclosure 618 includes a tenth channel adapter 646 and a third I/O controller 648 coupled to the tenth channel adapter 646.

According to InfiniBand terminology, subnets are also referred to as "clusters", and clusters can contain one or more subnets. An InfiniBand compliant subnet requires at least one subnet manager that performs basic management services. In FIG. 6, the second host 604 is denoted as the subnet manager and contains the software that is responsible for initializing and monitoring the fabric. At a minimum the subnet manager 604 has to discover fabric topology, assign unique addresses to all channel adapter ports that are connected to the fabric, program switch forwarding tables and prepare all fabric connected agents so that they can communicate with other fabric agents. Particular implementations of the subnet manager 604 may include many other services that are required in a subnet. Examples may include a partition manager that assigns partition keys to fabric agents; a name services to identify fabric agents; a path services that provides path information to fabric agents; and a device configuration manager that assigns fabric-attached I/O controllers to fabric hosts etc.

Each host or I/O enclosure is connected to the subnet using one or more channel adapters. Each channel adapter contains one or more subnet attachment points called ports. Ports are assigned addresses that are unique within the subnet. I/O controllers in I/O enclosures are assigned to one or more hosts. A host that is assigned a fabric-attached I/O controller will typically load a device driver to manage the I/O controller. Each subnet needs a management entity, referred to as the subnet manager, which administers the subnet devices and interacts with the human system administrator as needed. Examples of functions a subnet manager performs are detecting arrival and removal of new channel adapters on the fabric, assigning addresses to ports and preparing them for fabric connectivity and assigning I/O controllers to hosts. With reference to FIG. 6, the second host 604 is the designated subnet manager.

Figure 7:
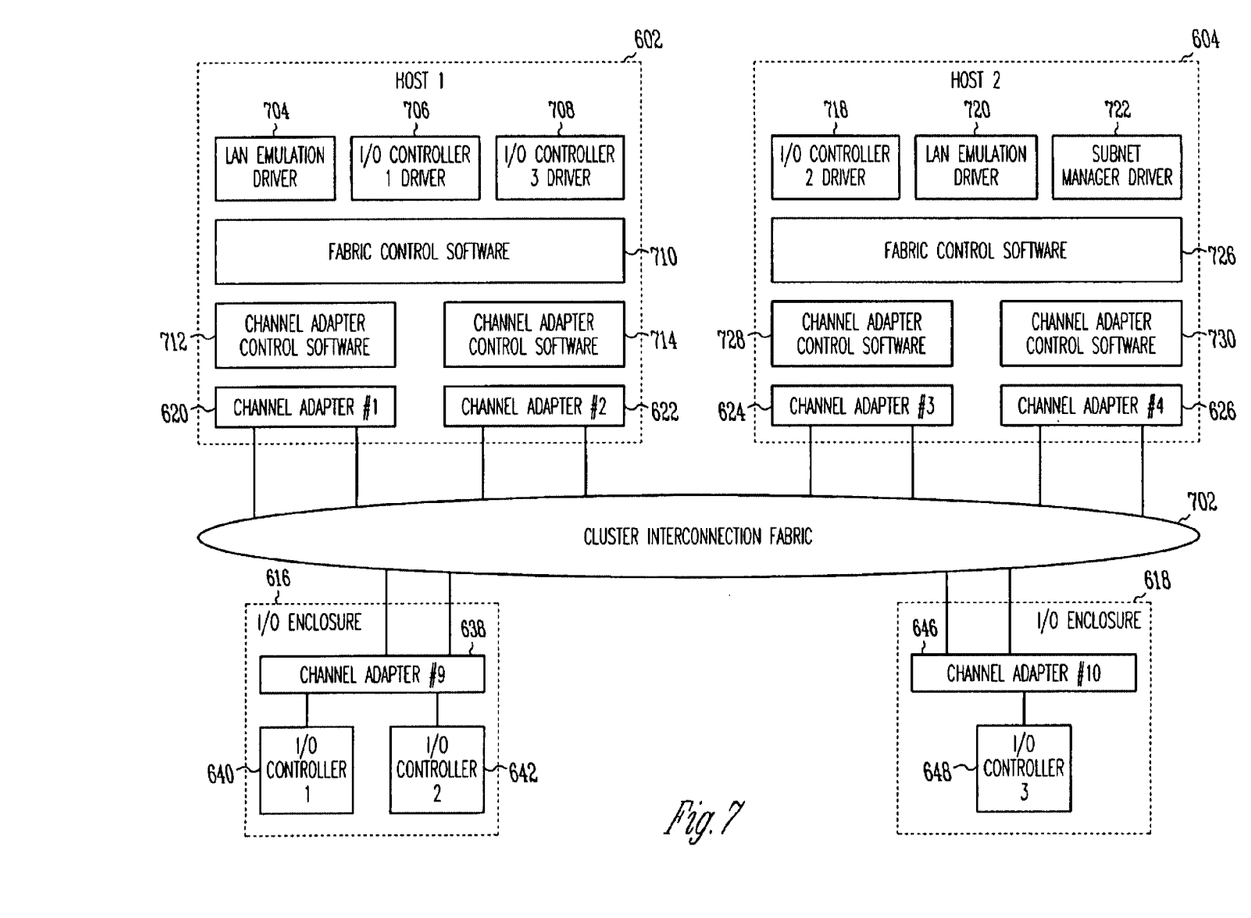
FIG. 7 illustrates software running on hosts in the example subnet depicted in FIG. 6.

FIG. 7 shows the software running on the first host 602 and the second host 604 in the example subnet 600 of FIG. 1. For simplicity, the software running on the third host 606 and the fourth host 608 is not shown.

With reference to FIG. 7, the first I/O controller 640 and the third I/O controller 648 are assigned to the first host 602 and the second I/O controller 642 is assigned to the second host 604. The first host 602, the second host 604, the first I/O enclosure 616, and the second I/O enclosure 618 are interconnected via a cluster interconnection fabric 702. The first host 602 includes a LAN emulation driver 704, an I/O controller 1 driver 706, an I/O controller 3 driver 708, fabric control software 710, the first channel adapter 620, first channel adapter control software 712 for the first channel adapter, the second channel adapter 622, and second channel adapter control software 714 for the second channel adapter.

Referring to FIG. 7, the second host 604 includes an I/O controller 2 driver 718, a LAN emulation driver 720, a subnet manager driver 722, fabric control software 726, the third channel adapter 624, a third channel adapter control software 728 for the third channel adapter, the fourth channel adapter 626, and a fourth channel adapter control software 730 for the fourth channel adapter.

The first I/O enclosure 716 includes the ninth channel adapter 638, the first I/O controller 640, and the second I/O controller 642. The second I/O enclosure includes the tenth channel adapter 646 and the third I/O controller 648.

The channel adapter control software (712, 714, 728, 730) shown in FIG. 7 interacts with the adapter hardware and is specific to the adapter hardware. The fabric control software, i.e., the fabric control driver (710, 726), is not specific to adapter hardware and provides uniform access to all types of adapter hardware to clients above it. The fabric control driver (710, 726) also provides a bus abstraction for the fabric and is responsible for causing the loading of drivers for fabric-attached resources (i.e. I/O controllers). Examples of drivers whose loading is initiated by the fabric control driver are drivers for fabric-attached I/O controllers and a LAN emulation driver that makes the subnet (or cluster) appear like a local area network.

A basic feature of such a subnet is that all ports on all channel adapters are managed by the subnet manager. When a new host is plugged into the subnet and powered on, the subnet manager first has to become aware of the presence of the new channel adapter. Once that happens, the subnet manager has to assign each port a unique address, transition the ports through different states and prepare it for fabric connectivity by detecting paths to other ports and updating switch forwarding tables.

Every subnet manager is required to discover subnet topology and assign unique addresses to fabric-attached ports so that each port can be uniquely identified and addressed. These addresses are called Local IDs ("LIDs") in InfiniBand terminology. The LID is used as an address to route messages from the source port to the destination port in the fabric. The LID is unique only within a single subnet; ports on different subnets may have the same LID. The subnet manager assigns unique LIDs after it has finished discovering all ports on a subnet.

A fabric-attached port can be assigned multiple LIDs as per the InfiniBand specification. Each LID for a port specifies a different path to that port from some other port on the fabric.

To program a different LID for each path to a port, the subnet manager has to identify every single path to this port from every other port on the fabric. It has to repeat the procedure for every single port on the fabric. For analyzing paths between two ports, a separate analysis has to be done in each direction. This is because a path from port A to port B traversing a set of switches and links is not necessarily identical to the reverse path from port B to port A using the exact same set of switches and links. The same set of links and switches may support different service levels in each direction and these are path attributes that need to be analyzed by the subnet manager in each direction. At a minimum, path analysis involves detecting physical connectivity, analyzing service levels for each path, analyzing maximum transfer unit size for each path and programming of switch forwarding tables. It may also involve calculating latency costs for the path and programming service level to virtual lane mapping tables in switches. In an example disadvantageous arrangement, a simple subnet manager may perform a complete path analysis before assigning LIDs to ports. Once it completes path analysis, the subnet manager may assign LIDs in sequential order, with no gaps between the LIDs assigned to different ports. There are several problems with this approach.

First, for a fabric that is highly connected, there may be a large number of redundant links between switches. This is especially true for clusters that are required to be highly available and contain redundant channel adapters and links to eliminate single points of failure or for enhanced performance. As a result, there may be a large number of paths between fabric-attached ports. Full path analysis for the cluster involves detecting every path from each port to every other port. As the number of fabric-attached ports to analyze increases, the amount of time it takes to run the path analysis algorithm increases exponentially. Another factor that affects this is that some of the path analysis work may require the use of unreliable datagram packets that are not guaranteed to be delivered in order or delivered at all. This means that the subnet manager may have to wait for a relatively large time-out period before it repeats a packet for which it did not get a response. Therefore, the time it takes to complete this analysis for a large subnet can be very large. The fabric is not operational till the subnet manager has assigned LIDs to each port. The software driver stack which controls the cluster channel adapter on the host and I/O enclosure is held suspended till the channel adapter has been initialized by the subnet manager. The software driver stacks that control fabric-attached I/O controllers also cannot initialize till the cluster channel adapter is functional. Thus, in the example disadvantageous arrangement, a highly connected cluster in which the subnet manager conducts full path analysis before programming LIDs may spend a large amount of time without any fabric connectivity while it waits for the subnet manager to complete its task.

Second, when a new link is inserted in the fabric, the subnet manager has to repeat the path analysis for the affected parts of the subnet. As a result of the new link insertion, more paths may be created between existing fabric-attached ports. In this case, it may be desirable to assign more LIDs to existing ports so that newly created paths may be represented by new LIDs. However, InfiniBand architecture requires that the multiple LIDs assigned to a port should be numbered consecutively. If ports were assigned LIDs in consecutive order to start with, it may not be possible in the example disadvantageous arrangement to assign more LIDs to a port since the subsequent consecutive LIDs may have already been allocated to another port. It is not possible to reassign LIDs to all fabric ports in response to a new-link event without causing a major perturbation to applications that are using existing LIDs to communicate between different ports. Therefore, according to the example disadvantageous arrangement, a simple subnet manager may not be able to assign more LIDs to ports as new paths are introduced in the subnet.

The present invention provides a procedure that allows a subnet manager to minimally initialize an InfiniBand subnet quickly and overcome the aforementioned problems. The procedure allows the software driver stacks that control the channel adapter on the hosts and I/O enclosures to continue with their initialization sequence in parallel while the subnet manager is performing complete path analysis for the subnet. The procedure also allows the device driver stacks for fabric-attached I/O devices to perform their initialization in parallel while the subnet manager is performing full path analysis. Advantageously, as taught herein, the fabric is functional and connected during the time the complex path analysis is being performed by the subnet manager. In addition, this procedure allows a subnet manager to assign more LIDs to a port if new paths are created in the fabric after the subnet manager has finished initial LID assignment.

Figure 8:
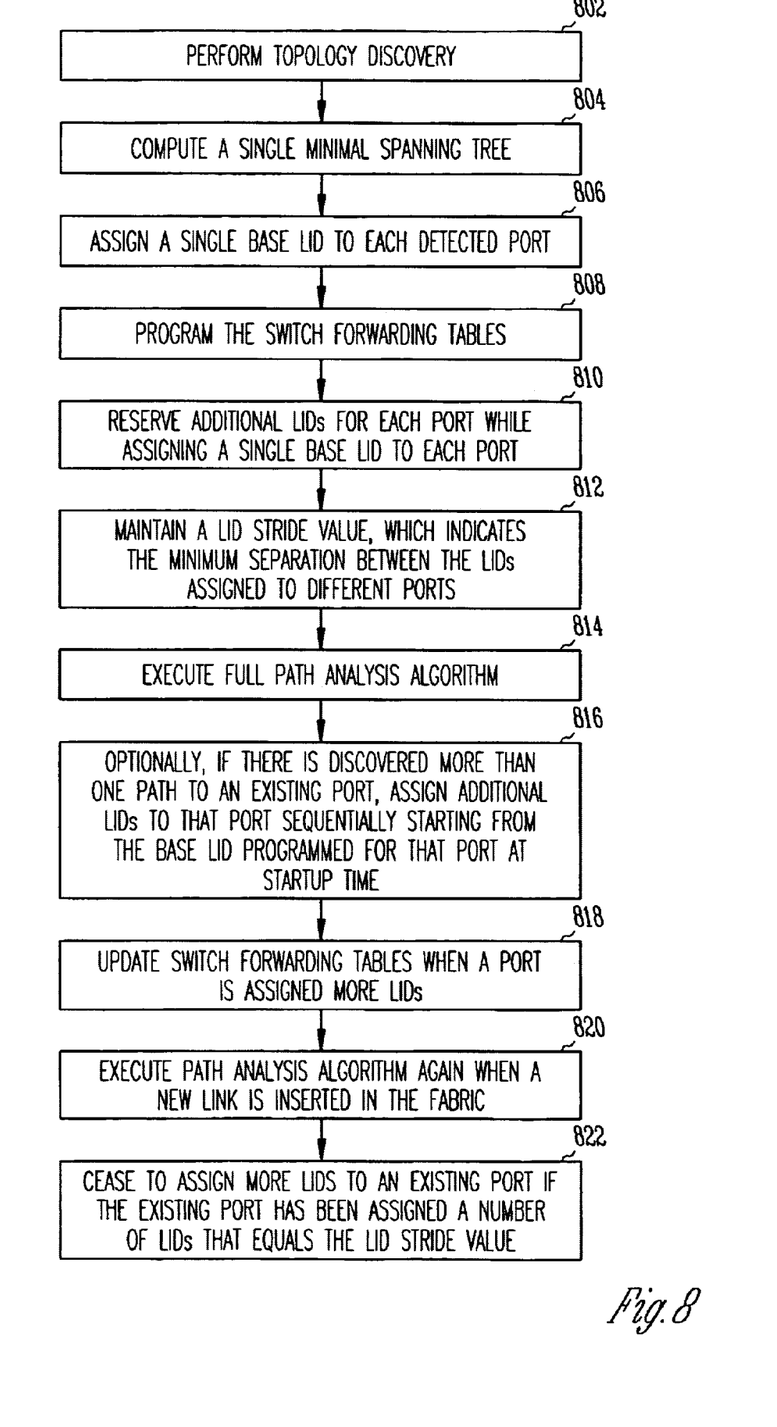
FIG. 8 is a process flow diagram for describing initialization of a subnet according to an embodiment of the present invention.

FIG. 8 is a process flow diagram for describing a process of initializing a subnet in accordance with the principles of the invention. As shown in FIG. 8 for purposes of illustration, when the subnet is powered on for the first time, the subnet manager does not execute its full path analysis algorithm to completion before assigning LIDs to fabric-attached ports. With reference to FIG. 8, to initialize the subnet, in block 802, the subnet manager first performs topology discovery as it normally would. In block 804, the subnet manager then executes an algorithm that computes a single minimal spanning tree for the subnet. The minimal spanning tree connects every fabric port to every other fabric port through a single path. This is typically significantly less time consuming than computing every path between each pair of fabric ports.

When the spanning tree has been computed, the subnet manager assigns a single base LID to each detected port in block 806. Once a single LID has been assigned to each port, the subnet manager programs the assigned LIDs into the switch forwarding tables (and service-level to virtual-lane mapping table entries in switches if needed) in block 808. This allows the cluster to be operational quickly using a single path between fabric attached ports, and fabric connectivity, though minimal, is achieved. Advantageously, device driver stacks that control the channel adapter and fabric-attached I/O controllers can continue with their initialization while the subnet manager is doing the full path analysis.

While the subnet manager assigns a single base LID to each port, it also reserves additional LIDs for each port in block 810. This is based on the assumption that more than one path already exists that will be detected during the full path analysis or may be created in the future by inserting new links or switches. This means that LIDs are not assigned to ports in consecutive sequential order. The subnet manager maintains a tunable parameter called a "LID stride value" in block 812. This tunable parameter indicates the minimum separation between the LIDs assigned to different ports. For example, if the LID stride value is 16, then each detected port is assigned a LID value such that the absolute difference between the LID values of any two ports is a multiple of 16. If four ports are detected on the fabric, the initial base LIDs assigned could be 1, 17, 33, and 49. LIDs that fall in between LID stride values are not initially assigned. The LID stride value serves as an upper bound on the amount of LIDs that are reserved, and is generally selected based on the type of devices being used. The LID stride value is used to limit the reservation of additional LIDs to a number that is meaningful given the subnet and manageable to a human administrator. Once this procedure is applied at subnet power-up, the subnet manager executes its full path analysis algorithm in block 814.

When the full path analysis algorithm completes, the subnet manager may discover more than one path to a port and may want to assign more LIDs to it. Optionally, if the subnet manager discovers more than one path to a port, and wants to assign more LIDs to the port, in block 816 the subnet manager assigns LIDs to a port sequentially starting from the initial base LID programmed for that port at startup time. As per the InfiniBand specification, the subnet manager is required to make sure that the number of LIDs assigned to any port is a power of two. As a port is assigned more LIDs, forwarding tables in the switches in the fabric are dynamically updated by programming the newly assigned LIDs thereinto, in block 818.

Advantageously, according to this aspect of the present invention, when new LIDs are assigned, there is no perturbation to communication channels that are using existing LID values. Whenever a new link is inserted in the fabric, the subnet manager can execute its path analysis algorithm again in block 820. If more paths have been created to an existing port, the subnet manager can assign it more LIDs. This can continue up to the point that a port has been assigned a number of LIDs that equals the LID stride value, upon which the subnet manager ceases to assign more LIDs to the existing port in block 822.

Several variations in the operation of the subnet manager are possible. Some examples of variations to the basic procedure described above are given subsequently.

For example, the subnet administrator may decide to not apply the procedure of block 810 (i.e., reserving additional LIDs for each port) to ports on switches. That is, each port on a switch could be assigned exactly one LID and additional LIDs may not be reserved for switch ports. This is because there might be no benefit in assigning multiple LIDs to switch ports and in fact the switch may not support multiple LIDs for its ports.

A subnet administrator may decide to not apply the procedure of block 810 (i.e., reserving additional LIDs for each port) to channel adapters that connect I/O enclosures to the subnet. This may be done if there is no perceived benefit of having multiple paths to such I/O enclosures due to constraints of the I/O enclosure (e.g., bandwidth). This restriction can be applied to all types of I/O controllers if appropriate or only to specific types of I/O enclosures (e.g., storage I/O enclosures).

The LID stride value may be different for channel adapters that connect host systems compared to channel adapters that connect I/O enclosures. This means that more (or fewer) LIDs may be reserved for ports on host systems than for I/O enclosures.

The LID stride value may change dynamically such that the subnet manager reserves fewer (or more) LIDs for newly connected ports in block 810 over the lifetime of a subnet. This may be useful if the subnet manager is running out of LIDs because a large number of them have been reserved during initial fabric power-on. As more ports are added, the subnet administrator may decrease the LID stride value to reserve fewer LIDs to allow more ports to be connected to the fabric in the future.

A sophisticated subnet manager may run a LID reclamation algorithm on some or all fabric ports either periodically or as necessary. This means that if it is perceived that some ports will not need the LIDs reserved for them, the subnet manager may attempt to reclaim them for potential assignment to future additions to the subnet. Note that this may not always be possible due to the InfiniBand restriction that the number of LIDs assigned to a port has to be a power of two.

Some of the variations described above may be combined to achieve the objectives of a specific subnet implementation.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but not limited to, a local area network (LAN), a wide area network (WAN), a campus area network (CAN), a metropolitan area network (MAN), a global area network (GAN) and a system area network (SAN). Further, many other modifications may be made to adapt the teachings of the present invention to a particular situation without departing from the scope thereof. Therefore, it is intended that the present invention not be limited to the various example embodiments disclosed, but that the present invention includes all embodiments falling within the scope of the appended claims.

What is claimed is:

1. A method for initializing a cluster, comprising:

performing a topology discovery of a cluster that includes a fabric and ports, thereby detecting one or more ports;

computing a minimal spanning tree for the cluster, wherein the minimal spanning tree connects every port to every other port through a single path;

assigning a single base local identification value (LID) to each port;

programming the assigned LIDs into one or more forwarding tables in the fabric;

reserving a number of additional LIDs for each port while assigning the single base LID to each port; and executing a path analysis of the cluster.

2. The method of claim 1, further comprising:

assigning additional LIDs to a port.

3. The method of claim 2, further comprising:

assigning the additional LIDs sequentially starting from the base LID.

4. The method of claim 1, wherein:

each port on a switch in the fabric is assigned exactly one LID.

5. The method of claim 1, wherein:

the cluster includes an I/O enclosure coupled to the fabric, the I/O enclosure includes a channel adapter, and the channel adapter is assigned exactly one LID.

6. The method of claim 1, further comprising:

maintaining a LID stride value, wherein the LID stride value is an upper bound on the number of additional LIDs that are reserved.

7. The method of claim 6, wherein:

the LID stride value indicates a separation between the LIDs assigned to different ports.

8. The method of claim 6, further comprising:

changing the LID stride value.

9. The method of claim 1, further comprising:

updating the forwarding tables if additional LIDs are assigned to a port.

10. The method of claim 1, further comprising:

executing a path analysis of the cluster again.

11. The method of claim 6, further comprising:

ceasing to assign additional LIDs to an existing port if the existing port has been assigned a number of LIDs that equals the LID stride value.

12. A computer readable medium having stored thereon instructions which, when executed by a processor, cause the processor to perform a method for initializing a cluster, said method comprising:

performing a topology discovery of a cluster that includes a fabric and ports, thereby detecting one or more ports;

computing a minimal spanning tree for the cluster, wherein the minimal spanning tree connects every port to every other port through a single path;

assigning a single base local identification value (LID) to each port;

programming the assigned LIDs into one or more forwarding tables in the fabric;

reserving a number of additional LIDs for each port while assigning the single base LID to each port; and executing a path analysis of the cluster.

13. The computer readable medium of claim 12, wherein said method further comprising:

assigning additional LIDs to a port.

14. The computer readable medium of claim 13, wherein said method further comprising:

assigning the additional LIDs sequentially starting from the base LID.

15. The computer readable medium of claim 12, wherein:

each port on a switch in the fabric is assigned exactly one LID.

16. The computer readable medium of claim 12, wherein:

the cluster includes an I/O enclosure coupled to the fabric, the I/O enclosure includes a channel adapter, and the channel adapter is assigned exactly one LID.

17. The computer readable medium of claim 12, wherein said method further comprising:

maintaining a LID stride value, wherein the LID stride value is an upper bound on the number of additional LIDs that are reserved.

18. The computer readable medium of claim 17, wherein:

the LID stride value indicates a separation between the LIDs assigned to different ports.

19. The computer readable medium of claim 17, wherein said method further comprising:

changing the LID stride value.

20. The computer readable medium of claim 17, wherein said method further comprising:

updating the forwarding tables if additional LIDs are assigned to a port.

21. The computer readable medium of claim 12, wherein said method further comprising:

executing a path analysis of the cluster again.

22. The computer readable medium of claim 17, wherein said method further comprising:

ceasing to assign additional LIDs to an existing port if the existing port has been assigned a number of LIDs that equals the LID stride value.

23. A cluster, comprising:

a fabric;

a host coupled to the fabric and including a local channel adapter and a channel adapter driver;

an I/O enclosure coupled to the fabric and including a remote channel adapter;

a subnet manager coupled to the fabric;

wherein the channel adapter driver and the I/O enclosure perform their respective initialization sequences while the subnet manager is performing a path analysis of the cluster.

24. The cluster of claim 23, wherein:

the fabric is functional and connected while the subnet manager is performing the path analysis.

25. The cluster of claim 23, wherein:

before performing the path analysis, the subnet manager performs a topology discovery of the cluster, detects one or more ports, and assigns a single base LID to each detected port.

26. The cluster of claim 25, wherein:

if additional LIDs are assigned to a port, the subnet manager assigns the additional LIDs sequentially starting from the base LID.

* * * * *